US007012711B2

(12) United States Patent
Hayama

(10) Patent No.: US 7,012,711 B2
(45) Date of Patent: Mar. 14, 2006

(54) IMAGE PRINTING METHOD, IMAGE PRINTING APPARATUS, AND IMAGE PRINTING SYSTEM, AS WELL AS LABEL PRODUCING METHOD, AND LABEL PRODUCING SYSTEM

(75) Inventor: Hitoshi Hayama, Shiopri (JP)

(73) Assignee: Seiko Epson Corporation, Tokyo (JP)

( * ) Notice: Subject to any disclaimer, the term of this patent is extended or adjusted under 35 U.S.C. 154(b) by 972 days.

(21) Appl. No.: 10/026,209

(22) Filed: Dec. 21, 2001

(65) Prior Publication Data

US 2002/0109862 A1 Aug. 15, 2002

(30) Foreign Application Priority Data

Jan. 11, 2001 (JP) ............................. 2001-003828

(51) Int. Cl.
*G06F 15/00* (2006.01)

(52) U.S. Cl. ....................... 358/1.18; 358/1.1; 358/1.9; 382/286; 382/294; 399/383; 399/384; 399/386; 399/387

(58) Field of Classification Search ............... 358/1.18; 382/286, 294; 399/383–387
See application file for complete search history.

(56) References Cited

U.S. PATENT DOCUMENTS

| | | | | |
|---|---|---|---|---|
| 5,699,166 | A * | 12/1997 | Edatsune et al. | 358/296 |
| 5,867,634 | A | 2/1999 | Hirota et al. | 358/1.2 |
| 6,290,327 | B1 * | 9/2001 | Hosokawa et al. | 347/41 |
| 6,499,822 | B1 * | 12/2002 | Abe et al. | 347/19 |
| 6,501,560 | B1 * | 12/2002 | Takayanagi | 358/1.16 |

FOREIGN PATENT DOCUMENTS

| | | |
|---|---|---|
| JP | 58-072239 | 4/1983 |

* cited by examiner

*Primary Examiner*—Edward Coles
*Assistant Examiner*—Mark R. Milia
(74) *Attorney, Agent, or Firm*—Hogan & Hartson, L.L.P.

(57) ABSTRACT

There are provided an image printing method method, an image printing apparatus, an image printing system, as well as a label producing method and a label producing system, which are capable of communicating print image data representing a desired print image in units of line data items, and at the same time printing a plurality of the print images at a high speed. When N copies of a print image, where N is an integer equal to or larger than 2, are printed on a print medium side by side in a direction along an X axis of the print medium, assuming that the X axis and an Y axis are two axes orthogonal to each other or a two-dimensional rectangular coordinate system, the print image being formed of J dots in the direction along the X axis by K dots in a direction along the Y axis where J is an integer equal to or larger than 2 and K is an integer equal to or larger than 2, line data items each representing one line of J dots are sequentially received according to a predetermined communication protocol from a predetermined other end of communication opposite party, whereby K line data items corresponding to K lines in the direction along the Y axis are sequentially received. When a k-th line data item (k is an arbitrary integer defined as $1 \leqq k \leqq K$) of the K line data items is received, a k-th long line data item is formed which represents one line of N times J dots formed by arranging N lines of J dots side by side in the direction along the X axis, and the one line of N times J dots is printed as a k-th line on the print medium in the direction along the X axis thereof.

44 Claims, 11 Drawing Sheets

F I G. 1
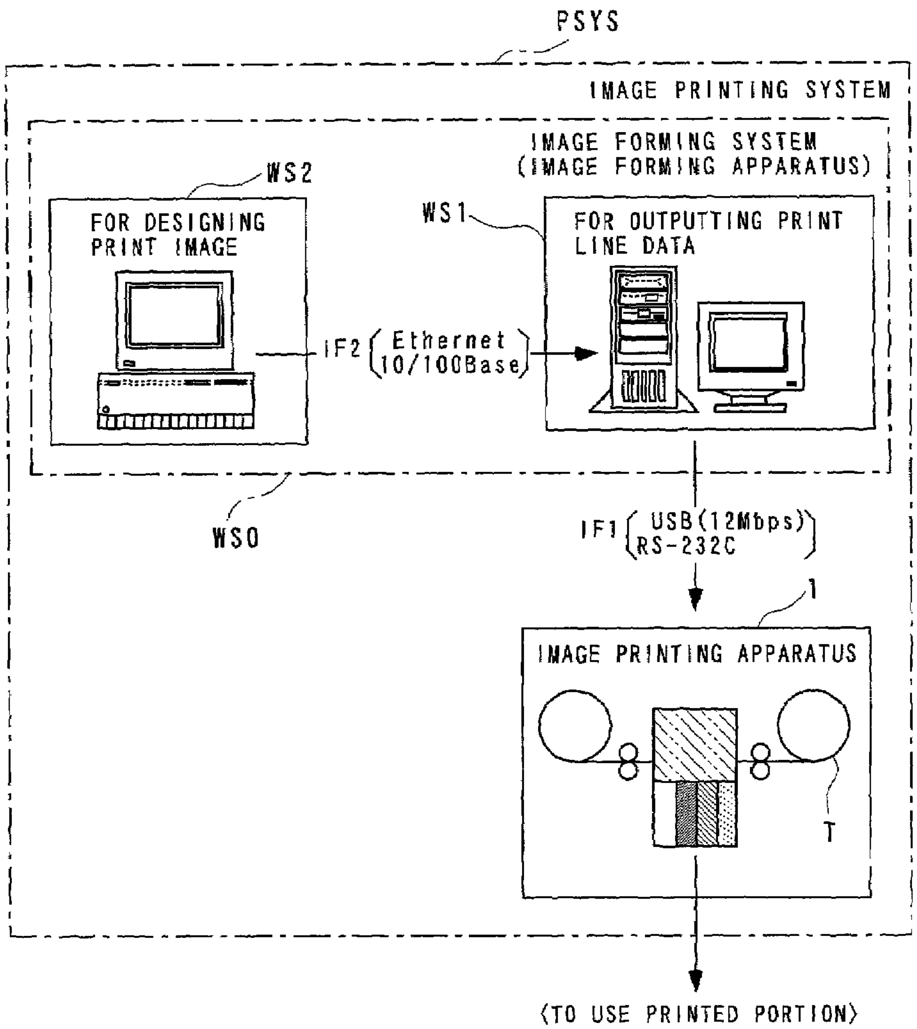

F I G. 4
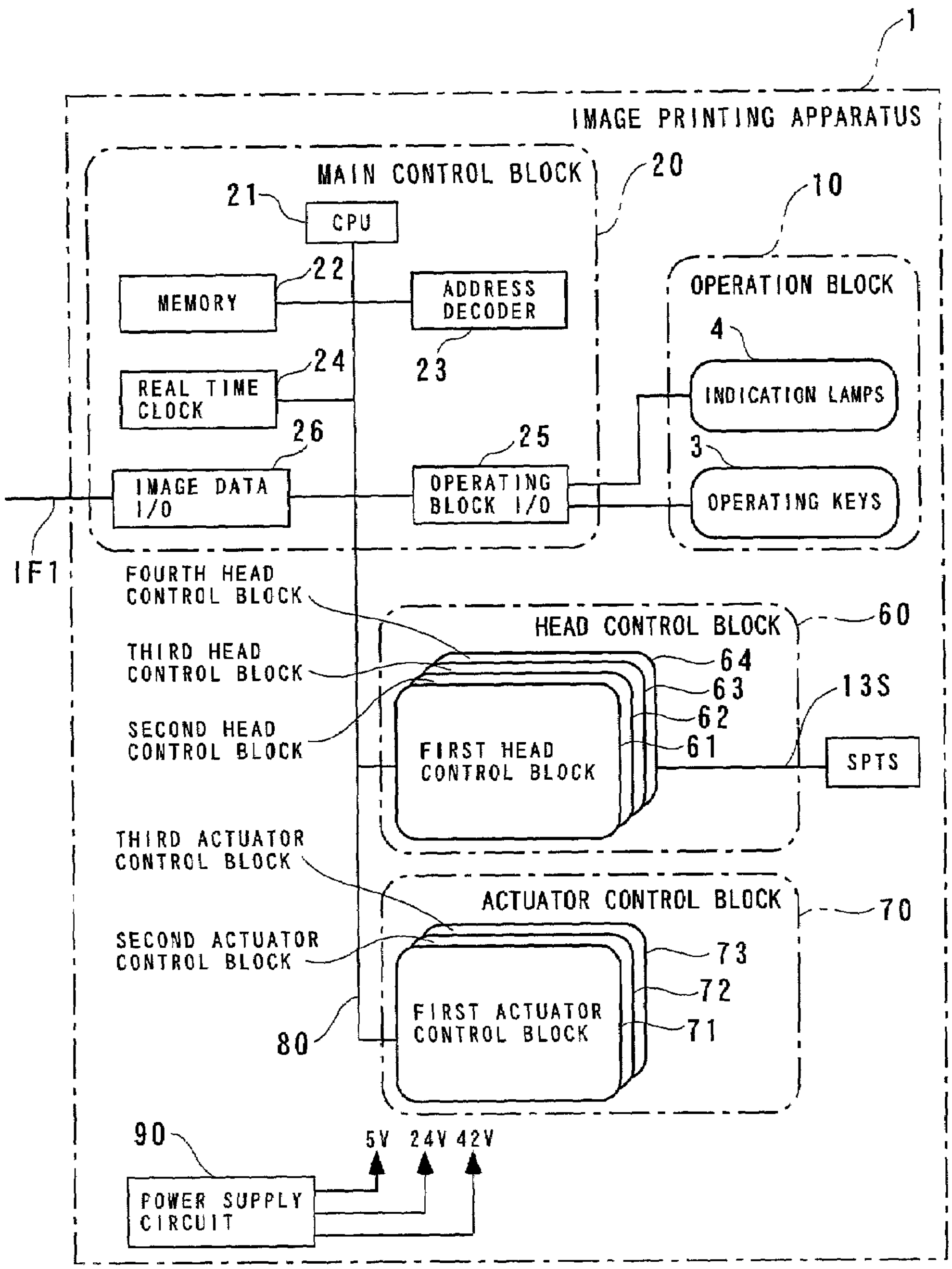

F I G. 5
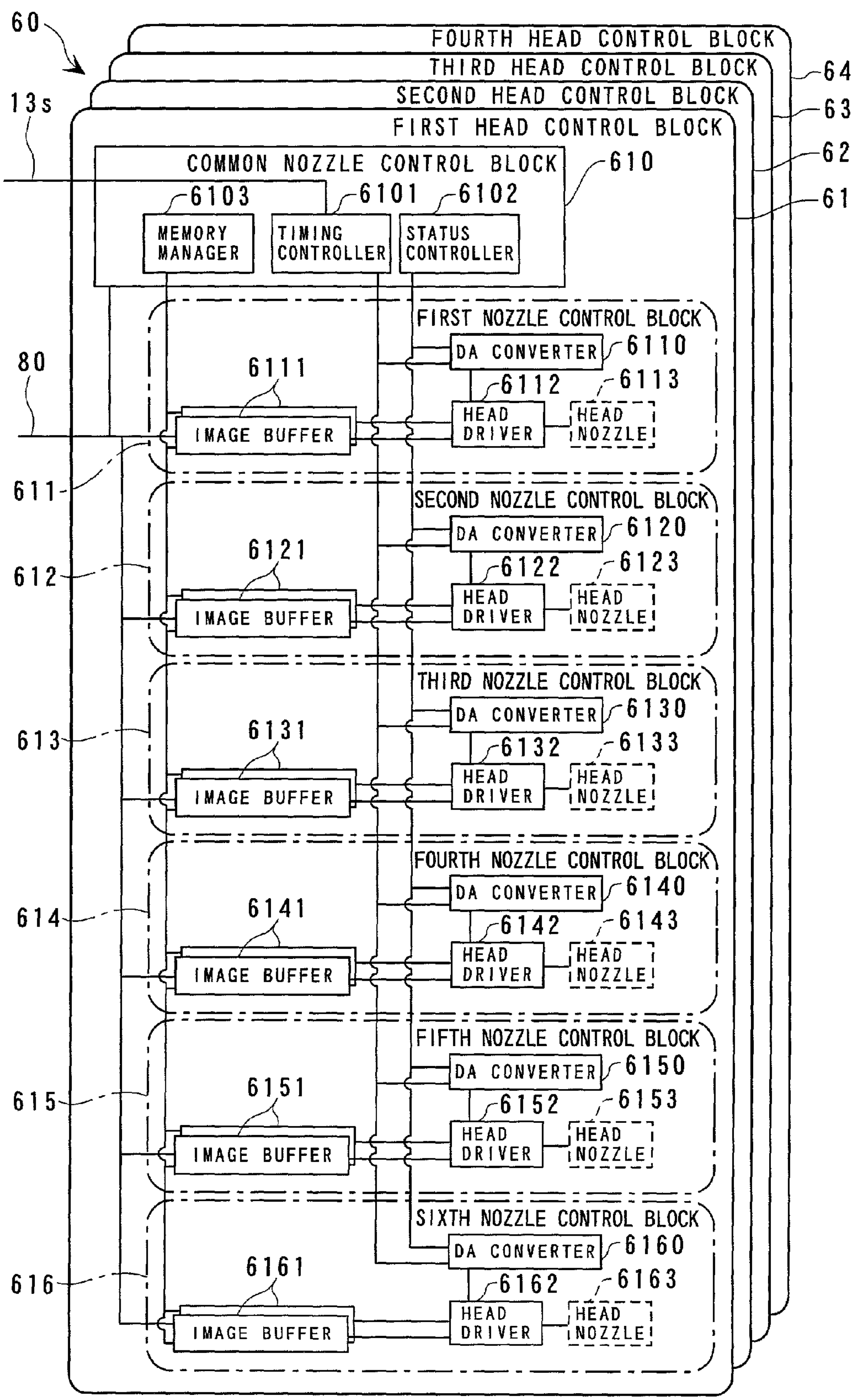

F I G. 9
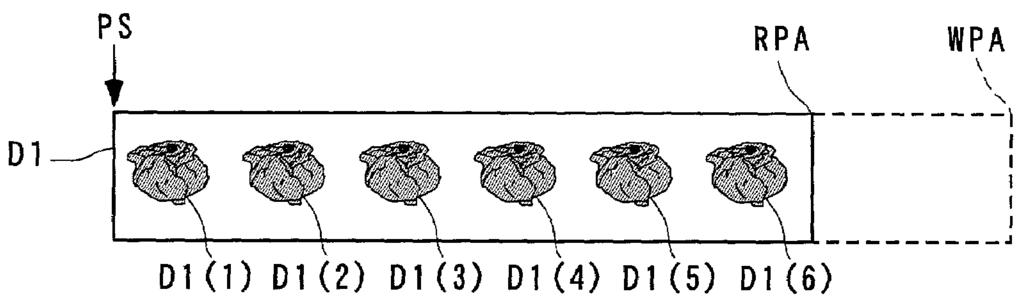

IMAGE PRINTING METHOD, IMAGE PRINTING APPARATUS, AND IMAGE PRINTING SYSTEM, AS WELL AS LABEL PRODUCING METHOD, AND LABEL PRODUCING SYSTEM

BACKGROUND OF THE INVENTION

1. Field of the Invention

This invention relates to an image printing method, an image printing apparatus and an image printing system, which are capable of printing a plurality of copies of a desired print image, as well as a label producing method and a label producing system, which are capable of producing labels having the print image printed thereon.

2. Prior Art

When N copies of a print image (N is an integer equal to or larger than 2) are printed, generally, the print image is printed based on print image data representing the print image, and the same printing operation is repeatedly carried out N times. Alternatively, unless the capacity of memory is strictly limited, after integrated print image data having N copies of the print image data arranged side by side is prepared, the N copies of the desired print image can be printed at a time based on the integrated print image data.

Now, there is a case in which print image data representing a desired print image is formed by an image forming apparatus, such as a personal computer or a work station, which excellent in capability of processing and editing print images, such as contour lines, and then the formed print image data is sent to a high-speed, high-(print) quality image printing apparatus to print the desired print image based on the received print image data (see FIG. 1). In the case of such an image printing system, convenience in forming print image data is ensured by the image forming apparatus, such as a personal computer, while high-speed and high-quality printing is ensured by the image printing apparatus.

However, in the conventional image printing apparatus for use with the image printing system of the above-mentioned kind, it is impossible to print a plurality of copies of a print image until print image data representing the print image is received. Hence, even if the image forming apparatus and the image printing apparatus are high in performance, if print image data is transferred (communicated) at a low speed from the image forming apparatus to the image printing apparatus, the limited communication speed makes it difficult to attain high-speed printing. For instance, when N copies of a print image, where N is an integer equal to or larger than 2, each formed by J dots by K dots, where J is an integer equal to or larger than 2 and K is an integer equal to or larger than 2, are printed, if print image data representing the print image is communicated in units of line data items each representing one line of the print image data, and K line data items corresponding to K lines are sequentially transmitted, the N copies of the print image cannot be printed until all the K line data items have been received. Such adverse effects of the communication speed on the printing speed are particularly marked when print image data to be communicated or transmitted is large-sized (large in volume) that is, when the amount of information (information for designating gradation values or the like) with respect to one dot is large as in the case of color images being transferred or when the size (number of dots) of a print image is large, for instance.

SUMMARY OF THE INVENTION

It is a first object of the invention to provide an image printing method, an image printing apparatus and an image printing system, which are capable of communicating print image data representing a desired print image in units of line data items each representing one line of the print image data, and at the same time printing a plurality of copies of the print image at a high speed.

It is a second object of the invention to provide a label producing method and a label producing system, which are capable of communicating print image data representing a desired print image in units of line data items each representing one line of the print image data, and at the same time printing a plurality of copies of the print image at a high speed, thereby producing labels printed with the desired print image.

To attain the first object, according to a first aspect of the invention, there is provided a method of printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2.

The image printing method according to the first aspect of the invention is characterized by comprising the steps of:

sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis; and printing the one line of N times J dots represented by the k-th long line data item, as a k-th line on the print medium in the direction along the X axis thereof.

To attain the first object, according to a second aspect of the invention, there is provided an image printing apparatus for printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2.

The image printing apparatus according to the second aspect of the invention is characterized by comprising:

line data-receiving means for sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

long line data-forming means for setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis; and line printing means for printing the one line of N times J dots represented by the k-th long line data item, as a k-th line on the print medium in the direction along the X axis thereof.

According to the image printing method and the image printing apparatus, basically, N copies of a print image, where N is an integer equal to or larger than 2, are printed on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2. Line data items of print image data representing the print image, each representing one line of the J dots arranged in the direction along the X axis, are sequentially received according to a predetermined communication protocol from a predetermined other end of communication, whereby K line data items corresponding to K lines in the direction along the Y axis are sequentially received.

Further, according to the image printing method and image printing apparatus, a k-th line data item (k is an arbitrary integer defined as $1 \leqq k \leqq K$) of the K line data items is set to a k-th short line data item when the k-th line data item is received, and N copies of the k-th short line data item are sequentially arranged side by side to form a k-th long line data item representing one line of N times J dots formed by arranging N lines of the J dots in the direction along the X axis. Then, the one line of N times J dots represented by the k-th long line data item is printed, as a k-th line on the print medium in the direction along the X axis thereof. In this case, after the k-th line data item (k-th short line data item) has been received, N copies of the k-th line data item can be prepared to form the k-th long line data, and one line of N times J dots can be printed whenever each line data item representing one line of J dots is received, without any need to await reception of all the K line data items, that is, reception of the whole print image data. In short, the communication of print image data and printing of a plurality of copies of a print image formed thereafter based on the print image data can be performed by parallel processing. Thus, in the present method and the image printing apparatus, it is possible to communicate print image data representing a desired print image in units of line data items each representing one line of the print image data, and at the same time print a plurality of the print images at an increased speed.

Preferably, the image printing method further includes the step of specifying the integer N which is a number of copies of the print image.

Preferably, the image printing apparatus further includes print number-specifying means for specifying the integer N which is a number of copies of the print image.

According to these preferred embodiments, the integer N as the number of to-be-printed copies of the print images is designated, and hence the k-th long line data item representing one line of N times J dots can be formed based on the k-th short line data item representing one line of J dots.

Preferably, the image printing method further includes the step of receiving print number data indicative of the integer N which is a number of copies of the print image.

Preferably, the image printing apparatus further includes print number data-receiving means for receiving print number data indicative of the integer N which is a number of copies of the print image.

According to these preferred embodiments, since print number data indicative of the integer N is received, it is possible to easily form the k-th long line data item representing one line of N times J dots based on the k-th short line data item representing one line of J dots.

Preferably, a predetermined printable dot number M which is a number of dots printable in the direction along the X axis is determined based on the k-th long line data item, and the image printing method further include the step of determining the integer N which is a number of copies of the print image, based on the integer J which is a number of dots of the print image in the direction along the X axis and the predetermined printable dot number M.

Preferably, a predetermined printable dot number M which is a number of dots printable in the direction along the X axis is determined based on the k-th long line data item, and the image printing method further includes the step of determining the integer N which is a number of copies of the print image, based on the integer J which is a number of dots of the print image in the direction along the X axis and the predetermined printable dot number M.

According to these preferred embodiments, a predetermined printable dot number M of dots printable in the direction along the X axis is determined based on the k-th long line data item. More specifically, since N times $J \leqq M$ holds, the integer N which is the number of to-be-printed copies of the print image can be determined based on the integer J as the number of dots of the print image in the direction along the X axis and the predetermined printable dot number M, whereby it is possible to easily form the k-th long line data item representing one line of N times J dots, based on the k-th short line data item representing one line of J dots.

Preferably, a predetermined printable length L within which printing can be carried out in the direction along the X axis is determined based on the k-th long line data item, and the image printing method further includes the step of determining the integer N which is a number of copies of the print image, based on the integer J which is a number of dots of the print image in the direction along the X axis, a print density, and the predetermined printable length L.

Preferably, a predetermined printable length L within which printing can be carried out in the direction along the X axis is determined based on the k-th long line data item, and the image printing apparatus further includes print number-determining means for determining the integer N which is a number of copies of the print image, based on the integer J which is a number of dots of the print image in the direction along the X axis, a print density, and the predetermined printable length L.

According to these preferred embodiments, a predetermined printable length L within which the print images can be printed in the direction along the X axis is determined based on the k-th long line data item. More specifically, since $J \times N \times \text{print density} \leqq L$ holds, the integer N as the number of to-be-printed copies of the print image can be determined based on the integer J as the number of dots of the print image in the direction along the X axis, the print density, and the predetermined printable length L, whereby it is possible to easily form the k-th long line data item representing one line of N times J dots, based on the k-th short line data item representing one line of J dots.

Preferably, the image printing method further includes the step of specifying the print density.

Preferably, the image printing apparatus further includes print density-specifying means for specifying the print density.

According to these preferred embodiments, since the print density is designated, the integer N as the number of to-be-printed copies of the print image satisfying the expression J×N×print density≦L can be determined with ease, thereby making it possible to easily form the k-th long line data item based on the k-th short line data.

Preferably, the image printing method further includes the step of receiving print density data indicative of the print density.

Preferably, the image printing apparatus further includes print density data-receiving means for receiving print density data indicative of the print density.

According to these preferred embodiments, since the print density data indicative of the print density is received, the integer N satisfying the expression J×N×print density≦L can be determined with ease, thereby making it possible to easily form the k-th long line data item based on the k-th short line data.

Preferably, the image printing method further includes the step of detecting the integer J, based on received line data.

Preferably, the image printing apparatus further includes dot number-detecting means for detecting the integer J, based on received line data.

According to these preferred embodiments, the integer J as the number of dots of the print image in the direction along the X axis is detected based on a received line data item, and hence the integer N can be determined with ease, thereby making it possible to easily form the k-th long line data item based on the k-th short line data item.

Preferably, the image printing method further includes the step of receiving dot number data indicative of the integer J.

Preferably, the image printing apparatus further includes dot number data-receiving means for receiving dot number data indicative of the integer J.

According to these preferred embodiments, dot number data indicative of the integer J as the number of dots is received, so that the integer N as the number of to-be-printed copies of the print image can be determined with ease, thereby making it possible to easily form the k-th long line data item based on the k-th short line data item.

Preferably, in the image printing method, the print medium is in a continuous form and mounted such that a direction of length thereof coincides with the direction along the X axis.

Preferably, in the image printing apparatus, the print medium is in a continuous form and mounted such that a direction of length thereof coincides with the direction along the X axis.

According to these preferred embodiments, the print medium is in a continuous form and mounted such that the direction of a length thereof coincides with the direction along the X axis. More specifically, the copies of the print image can be printed on the print medium side by side in the direction of the length of the object, and the integer N as the number of to-be-printed copies of the print image can be increased with ease. This makes it possible to easily form the k-th long line data item representing one line of N times J dots of a print image to be formed by a larger number (number corresponding to a larger value of N) of copies of the original print image, based on the k-th short line data item representing one line of J dots received. Thus, the communication of print image data and printing of a plurality of print images formed based on the print image data can be carried out with enhanced parallelism, which makes it possible to communicate print image data representing a desired print image in units of line data items each representing one line of the print image data and at the same time print a plurality of the print images at a further increased speed.

Preferably, the image printing method further comprises the steps of forming the print image data, and sequentially transmitting the K line data items of the formed print image data via a first interface, and the step of sequentially receiving the K line data items corresponding to the K lines in the direction along the Y axis includes receiving the K line data items via the first interface.

According to this preferred embodiment, the print image data is formed, and the K line data items of the formed print image data are sequentially transmitted via the first interface. On a receiving side, when the k-th line data item (k-th short line data item) of the K line data items corresponding to the K lines is received, the k-th long line data is formed which represents one line of N times J dots formed by arranging N lines of J dots in the direction along the X axis, and the one line of N times J dots represented by the k-th long line data is printed as the k-th line on the print medium in the direction along the X axis of the object. Therefore, according to this preferred embodiment, it is possible to communicate print image data representing a desired print image via the first interface in units of line data items each representing one line of the print image data, and at the same time print a plurality of the print images at an increased speed.

To attain the first object, according to a third aspect of the invention, there is provided an image printing system comprising:

an image printing apparatus for printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2, the image printing apparatus including line data-receiving means for sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis, long line data-forming means for setting a k-th line data item (k is an arbitrary integer defined as 1≦k≦K) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis, and line printing means for printing the one line of N times J dots represented by the k-th long line data item, as a k-th line on the print medium in the direction along the X axis thereof;

print image data-forming means for forming the print image data; and print image data-transmitting means for sequentially transmitting the K line data items of the formed print image data via a first interface, wherein the line data-receiving means receives the K line data items via the first interface.

According to this image printing system, the print image data is formed, and the K line data items of the formed print image data are sequentially transmitted via the first interface. On a receiving side, when the k-th line data item (k-th short line data item) of the K line data items corresponding to the K lines is received, the k-th long line data is formed which represents one line of N times J dots formed by arranging N lines of J dots in the direction along the X axis, and the one line of N times J dots represented by the k-th long line data is printed as the k-th line on the print medium in the direction along the X axis of the object. Therefore, according to the image printing system, it is possible to communicate print image data representing a desired print image via the first interface in units of line data items each representing one line of the print image data, and at the same time print a plurality of the print images at an increased speed.

Preferably, in the image printing method, the first interface enables communication in conformity to an interface standard of RS-232C, USB, or IEEE1394.

Preferably, in the image printing system, the first interface enables communication in conformity to an interface standard of RS-232C, USB, or IEEE1394.

According to these preferred embodiments, the first interface enables communication in conformity to the interface standard of RS-232C, USB, or IEEE1394, and hence it is possible to communicate print image data representing a desired print image in units of line data items according to the interface standard of RS-232C, USB, or IEEE1394, and at the same time accelerate printing of a plurality of the print images.

Preferably, in the image printing method, the first interface enables communication in conformity to the Centronics standard.

Preferably, in the image printing system, the first interface enables communication in conformity to the Centronics standard.

According to these preferred embodiments, since the first interface enables communication in conformity to the Centronics standard, it is possible to communicate print image data representing a desired print image in units of line data items according to the Centronics standard, and at the same time accelerate printing of a plurality of the print images.

Preferably, in the image printing method, the step of sequentially transmitting the K line data items via the first interface includes the steps of transmitting the print image data via a second interface, receiving the print image data via the second interface and dividing the print image data into the K line data items, and sequentially transmitting the divided K line data items one by one via the first interface.

Preferably, the print image data-transmitting means comprises image data-transmitting means for transmitting the print image data via a second interface, data dividing means for receiving the print image data via the second interface and dividing the print image data into the K line data items, and line data-transmitting means for sequentially transmitting the divided K line data items one by one via the first interface.

According to these preferred embodiments, print image data is formed and transmitted via the second interface. On the other hand, on the receiving side, the received print image data is divided into K line data items to sequentially send the K line data items one by one via the first interface, and then a k-th long line data item is formed based on the k-th short line data item. One line of N times J dots represented by the produced k-th long line data item is printed as a k-th line on the print medium in the direction along the X axis thereof. Therefore, according to these preferred embodiments, it is possible to communicate print image data representing a desired print image via the second interface as well as communicate the print image data via the first interface in units of line data items each representing one line of the print image data, and at the same time accelerate printing of a plurality of the print images.

Preferably, in the image printing method, the second interface enables communication via a predetermined network.

Preferably, in the image printing system, the second interface enables communication via a predetermined network.

According to these preferred embodiments, the second interface enables communication via a predetermined network. Therefore, it is possible to communicate print image data representing a desired print image via the second interface using a predetermined network and at the same time communicate the print image data via the first interface in units of line data items each representing one line of the print image data, to thereby accelerate printing of a plurality of the print images.

Preferably, in the image printing method, the predetermined network includes the Internet.

Preferably, in the image printing system, the predetermined network includes the Internet.

According to these preferred embodiments, the network includes the Internet, so that the second interface enables communication via the predetermined network including the Internet. Therefore, in the image printing method and the image printing system, it is possible to communicate print image data representing a desired print image via the second interface through the predetermined network including the Internet, and at the same time communicate the print image data via the first interface in units of line data items each representing one line of the print image data, to thereby accelerate printing of a plurality of the print images.

Preferably, in the image printing method, the predetermined network includes a predetermined local area network.

Preferably, in the image printing system, the predetermined network includes a predetermined local area network.

According to these preferred embodiments, the network includes a predetermined Local Area Network (LAN), so that the second interface enables communication via the network including the predetermined LAN. Therefore, in the image printing method and the image printing system, it is possible to communicate print image data representing a desired print image via the second interface through the predetermined network including the LAN, and at the same time communicate the print image data via the first interface in units of line data items each representing one line of the print image data, to thereby accelerate printing of a plurality of the print images.

Preferably, in the image printing method, the second interface enables communication in conformity to an IEEE standard LAN-based communication protocol.

Preferably, in the image printing system, the second interface enables communication in conformity to an IEEE standard LAN-based communication protocol.

According to these preferred embodiments, the second interface enables communication in conformity to the IEEE standard LAN-based communication protocol. Therefore, it is possible to communicate print image data representing a desired print image via the second interface according to the IEEE standard LAN-based communication protocol and at the same time communicate the print image data via the first interface in units of line data items each representing one line of the print image data, to thereby accelerate printing of a plurality of the print images.

Preferably, in the image printing method, the second interface enables communication in conformity to at least one of data link protocols of Ethernet, FDDI, and ATM.

Preferably, in the image printing system, the second interface enables communication in conformity to at least one of data link protocols of Ethernet, FDDI, and ATM.

According to these preferred embodiments, the second interface enables communication in conformity to at least one of the data link protocols of Ethernet, FDDI, and ATM. Therefore, it is possible to communicate print image data representing a desired print image via the second interface according to at least one of the data link protocols of Ethernet, FDDI, and ATM and at the same time communicate the print image data via the first interface in units of line data items each representing one line of the print image data, to thereby accelerate printing of a plurality of the print images. It should be noted that in addition to the above data link protocols, those of Token Ring, 100VG-Any LAN, Fiber Channel, HIPPI (High Performance Parallel Interface), IEEE1394 (Fire Wire), and so forth can be used.

To attain the second object, according to a fourth aspect of the invention, there is provided a method of producing a label by using a printed image formed by printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2.

The label producing method according to the fourth aspect of the invention is characterized by comprising the steps of:

sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis;

printing the one line of N times J dots represented by the k-th long line data item, as a k-th line on the print medium in the direction along the X axis thereof; and producing labels each having the print image printed thereon by using each of portions of the print medium on which the N copies of the print image are printed, respectively.

To attain the second object, according to a fifth aspect of the invention, there is provided a label producing system for producing a label by using a printed image formed by printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2.

The label producing system according to the fifth aspect of the invention is characterized by comprising:

line data-receiving means for sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

long line data-forming means for setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis;

line printing means for printing the one line of N times J dots represented by the k-th long line data item, as a k-th line on the print medium in the direction along the X axis thereof; and label producing means for producing labels each having the print image printed thereon by using each of portions of the print medium on which the N copies of the print image are printed, respectively.

According to the label producing method and the label producing system, N copies of a print image can be printed at a high speed, so that it is possible to produce labels each having the print image printed thereon by using each printed portion of the print having the print image printed thereon.

Preferably, in the label producing method, the step of producing labels includes the step of cutting off the portions of the print medium into respective separate portions.

Preferably, in the label producing system, the label producing means includes cutting means for cutting off the portions of the print medium into respective separate portions.

According to these preferred embodiments, by cutting off the printed portions of the print medium into separate portions each having the print image printed thereon, it is possible to produce labels each having one print image printed thereon.

Preferably, in the label producing method, the print medium is formed such that the print medium can be affixed to a predetermined object article with the print image printed on a surface thereof, by peeling off a peel layer on a reverse side thereof.

Preferably, in the label producing system, the print medium is formed such that the print medium can be affixed to a predetermined object article with the print image printed on a surface thereof, by peeling off a peel layer on a reverse side thereof.

According to these preferred embodiments, the print medium is formed such that it can be affixed to predetermined object articles with the print image printed on a surface thereof, by peeling off a peel layer on a reverse side thereof. Hence, if the printed portions of the print medium, each having one of the N copies of the print image printed thereon, are used for producing labels each having one print image printed thereon, they provide labels which can be affixed to the predetermined object articles by peeling off the peel layers therefrom.

The above and other objects, features, and advantages of the invention will become more apparent from the following detailed description taken in conjunction with the accompanying drawings.

BRIEF DESCRIPTION OF THE DRAWINGS

FIG. 1 is an explanatory view schematically showing the arrangement of an image printing system to which are applied an image printing method, an image printing apparatus, an image printing system, a label producing method, and a label producing system according to an embodiment of the invention;

FIG. 4 is a block diagram schematically showing the arrangement of a control system of the FIG. 1 image printing apparatus;

FIG. 5 is a block diagram schematically showing the arrangement of a head control block shown in FIG. 4;

FIG. 9 is an explanatory view illustrating an example of a result of printing of a plurality copies of the print image;

DETAILED DESCRIPTION OF PREFERRED EMBODIMENT

The invention will now be described in detail with reference to the drawings showing an embodiment thereof. In the embodiment, an image printing method, an image printing apparatus, an image printing system, a label producing method, and a label producing system according to the invention are applied to an image printing system.

Referring first to FIG. 1, the image printing system PSYS includes am image forming system (or apparatus) WS0 including a personal computer, an engineering work station (EWS) or the like for forming print image data representing a desired print image, and the image printing apparatus 1 for printing a print image based on the print image data. The print image data formed by the image forming system WS0 is transferred (sent) to the image printing apparatus 1 via a first interface IF1 in units of line data items each representing one line of the print image data.

Figure 2:
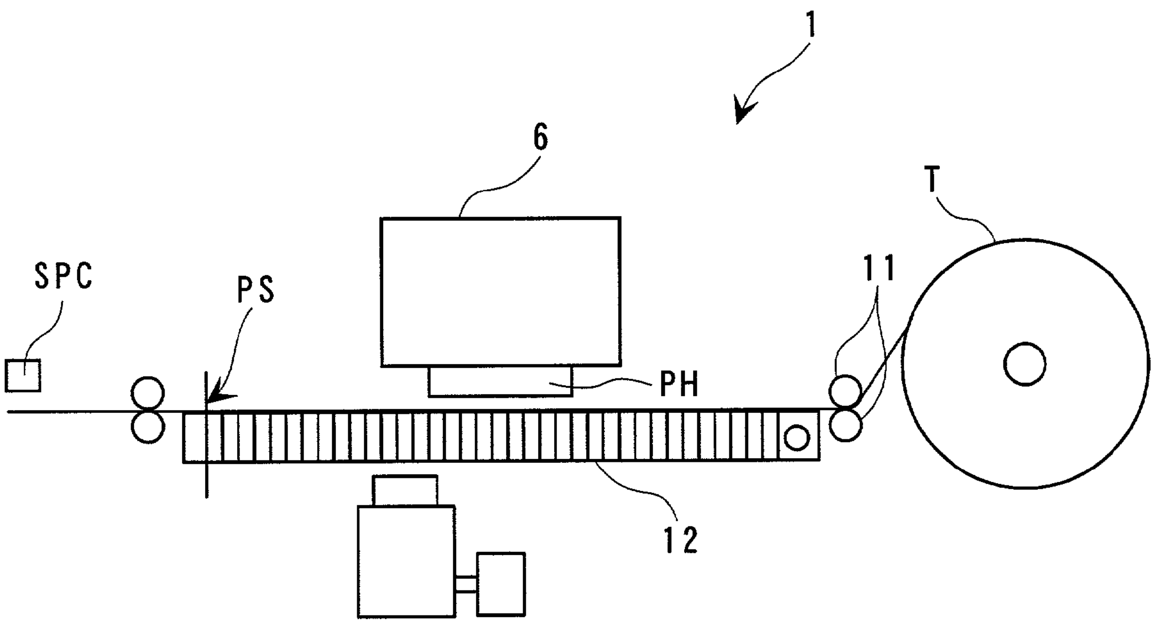
FIG. 2 is a schematic cross-sectional view of a mechanical system of the FIG. 1 image printing apparatus, as viewed from a side thereof.
Figure 3:
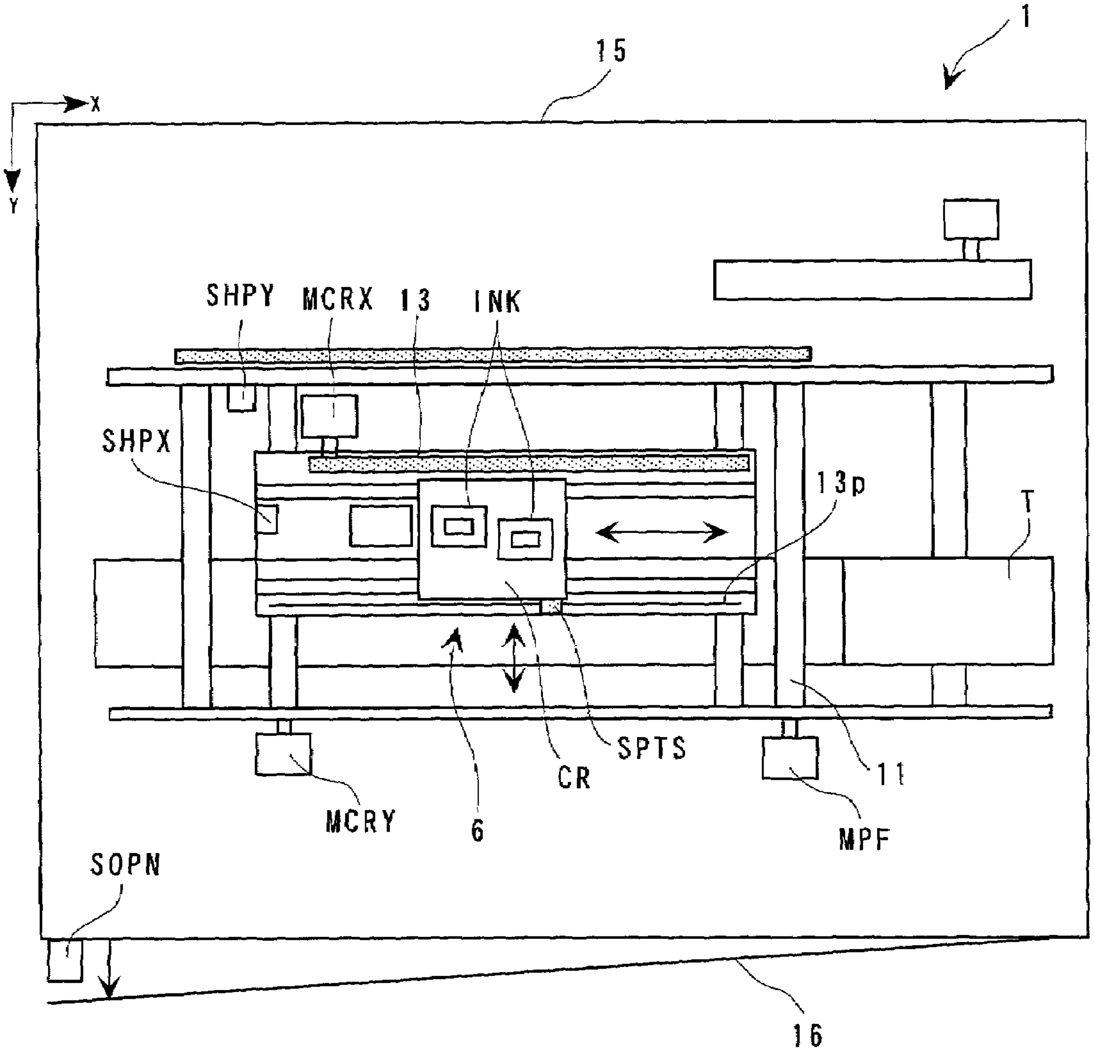
FIG. 3 is a schematic cross-sectional view of the mechanical system of the FIG. 1 image printing apparatus, as viewed from the top thereof.

Next, as shown in FIGS. 1 to 3, in the image printing apparatus 1, a tape T supplied (mounted) in a state wound around a tape reel (on a right-hand side as viewed in FIG. 2) is used as a print medium. A paper feed (PF) roller 11 driven by a paper feed (PF) motor MPF rolls out the tape T to an attraction unit 12 which is used as a work area for printing operation, and a print head group (ink jet head group) PH, described in detail hereinafter with reference to FIG. 9, which is carried on a head unit 6 prints on the tape T as desired. The printed portion of the tape T is sequentially delivered out of the image printing apparatus 1 in a leftward direction as viewed in FIG. 2. The attraction unit 12 is configured such that during the desired printing operation, it can hold the tape T at a predetermined printing position by using a fan, not shown. The tape T includes a type, such as an ordinary paper tape, which has no adhesive surface on the reverse side thereof, and a type which has an adhesive surface formed on the reverse side thereof with a peel-off paper covering the adhesive surface. It should be noted that as shown in FIG. 3, the following description will be given assuming that the direction of the length of the tape T is set to the direction along the X axis or as a main scanning direction, and a direction orthogonal to the direction of the length of the tape T is set to the direction along the Y axis or as a sub scanning direction.

The head unit 6 includes a carriage CR carried on a main scanning unit 13, an ink cartridge INK removably mounted in the carriage CR to hold inks of six colors (black (K), yellow (Y), magenta (M), cyan (C), light magenta (LM), and light cyan (LC)), and the print head group PH which is installed on a lower portion of the carriage CR such that it can be opposed to the tape T. The main scanning unit 13 is driven by a sub scanning carriage motor MCRY such that it can move above the top of the attraction unit 12 in the sub scanning direction (the direction along the Y axis). Further, the carriage CR is driven by a main scanning carriage motor MCRX such that it can move in the main scanning direction (the direction along the X axis), whereby (the print head group PH of) the head unit 6 can move above the top of the attraction unit 12 (i.e. the top of the work area for printing operation.

In this embodiment, a position at a printable area (workable area) WPA (see FIG. 9 and the like) located downstream of the tape T (on a left-hand side as viewed in the figures, i.e. on a side where the coordinate value "X" is small) and on a rear side (on a rear side in FIG. 2; at an upper left location in FIG. 3, i.e. on a side where the coordinate value "Y" is small) of the image printing apparatus 1, is set to a print-starting position PS. A main scanning home position sensor SHPX for sensing a home position of the head unit 6 for the main scanning (along the X axis) is arranged on the carriage CR, and a sub scanning home position sensor SHPY for sensing a home position of the head unit 6 for the sub scanning (along the Y axis) is arranged at a location shown in FIG. 3 (inside a casing, where an upper end of the carriage CR can be sensed).

On the main scanning unit 13, a predetermined (e.g. monochrome) pattern image 13*p* is arranged such that it can be sensed optically. At a location on the carriage CR, opposed to the pattern image 13*p*, there is arranged a print timing sensor SPTS which detects the position of the carriage CR by itself by sensing the pattern of the pattern image 13*p*, for recognition of print timing. As shown in FIG. 3, the above-mentioned component parts of the image printing apparatus 1 is accommodated in a protective casing 15. It should be noted that in addition to the sensors described above, there are provided, for instance, a protective casing opening/closing sensor SOPN which detects the opening and closing of a lid 16 of the protective casing 15 and gives an emergency stop to printing operation if it is detected that the lid 16 is opened during the printing operation, and a paper position sensor SPC for sensing the leading edge of the tape T.

Next, the arrangement of the control system of the image printing apparatus 1 will be described. As shown in FIG. 4, the control system of the image printing apparatus includes an operating block 10 having indicator lamps 4 and operating keys 3 for interfacing with the user (man-machine interface), a head control block 60 for controlling the print head 6 and component parts associated therewith, an actuator control block 70 for controlling actuators associated with the respective motors, a power supply circuit 90 for supplying power to each block, and a main control block 20 which serves as a center for controlling the blocks of the image printing apparatus 1.

The main control block 20 includes a CPU 21, a memory 22, an address decoder 23, and a real time lock 24, as well as an operating block input/output. (operating block I/O) 25 for interfacing with the operating block 10, an image data input/output (image data I/O) 26 for communication with the above image forming system WS0 via the first interface IF1 described above, all of which are connected to each other by an internal bus (CPU bus) 80 commonly used in the image printing apparatus 1. The head control block 60 includes first to fourth head control blocks 61 to 64. Similarly to the head control block 60, the actuator control block 70 also has a plurality of control blocks 71 to 73. However, detailed description thereof is omitted here.

Referring to FIGS. 4 and 5, the first head control block 61 of the head control block 60 includes a common nozzle control block 610, and first to sixth nozzle control blocks 611 to 616.

The common nozzle control block 610 includes a timing controller 6101 which controls the timing of ejection of ink droplets from each nozzle of the print head group PH. This control of the timing of ejection of ink droplets is carried out in response to a detection signal (encoder signal) 13*s* indicative of the pattern of the pattern image 13*p* sensed by the print timing sensor SPTS. The common nozzle control block 610 also includes a status controller 6102 for controlling the state of each nozzle of the print head group PH, and a memory manager (M/M) 6103 for managing buffering of data in image buffers 6111, 6121, 6131, 6141, 6151, and 6161.

The first nozzle control block 611 includes a D/A converter (DAC) 6110, an image buffer 6111, and a head driver 6112 for driving a head nozzle 6113. The DA converter (DAC) 6110 is used for converting control signals (digital signals) from the timing controller 6101 and the status controller 6102 to the control waveforms (analog signals) of applied voltages for driving the head driver 6112 (for piezoelectric ejection). The other nozzle control blocks 612 to 616 are also configured similarly to the first nozzle control block 611. Further, the other head control blocks 62 to 64 are also constructed similarly to the first head control block 61.

Figure 6A:
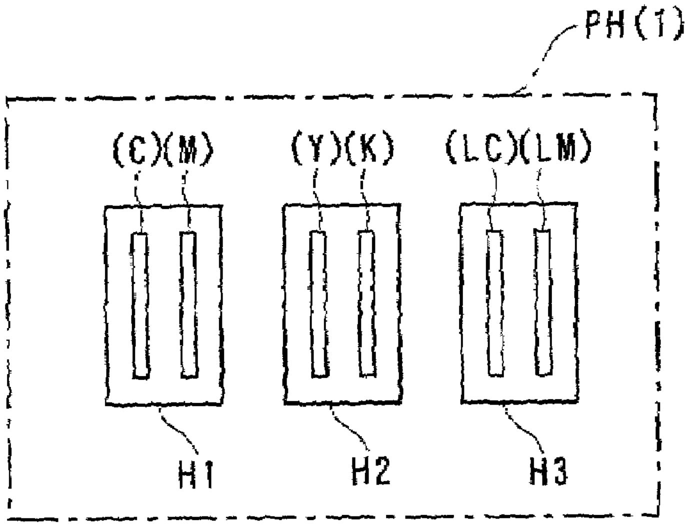
FIGS. 6A and 6B are views which are useful in explaining the function and arrangement of print heads and head nozzles mounted in a head unit.
Figure 6B:
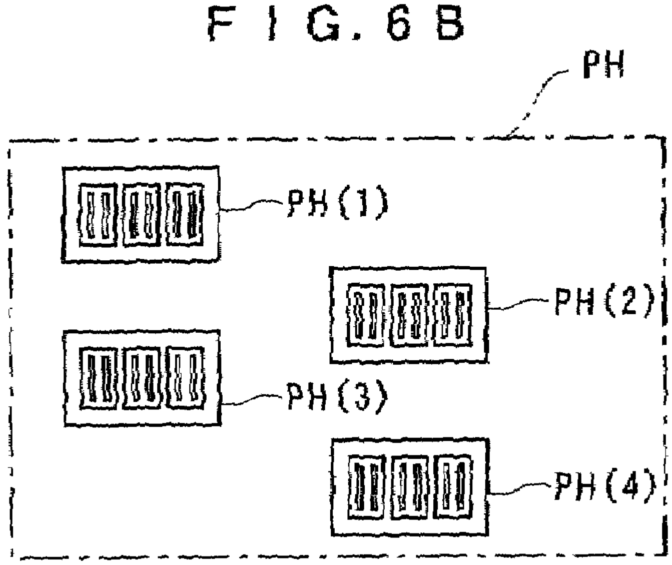

In this embodiment, six head nozzles 6113, 6123, 6133, 6143, 6153, and 6163, all of which are controlled by the first head control block 61, are nozzle arrays e.g. each comprised of 180 nozzles. Each of them is provided for ejecting an ink of one of the six colors (black (K), yellow (Y), magenta (M), cyan (C), light magenta (LM), light cyan (LC)). Let it be assumed, for instance, that as shown in FIG. 6A, three print heads H1 to H3 each having two nozzle arrays arranged therein are set to a print head group PH(1) which is controlled by the first head control block 61, and print head groups PH(2), PH(3), and PH(4) constructed similarly to the print head group PH(1) are controlled by the second to fourth head control blocks 62 to 64, respectively. In this case, as shown in FIG. 6B, the print head group PH used in the present embodiment includes the print head groups PH(1) to PH(4), and hence configured to have 4 times 3 heads (12-head configuration).

Further, the print head group PH may be configured such that the number of the head control blocks is changed according to a change in the specifications of the image printing apparatus, e.g. 6 times 3 heads (18-head configuration), or 3 times 3 heads (9-head configuration). Further, in this case, the image printing apparatus 1 may be configured, for instance, such that each head control block is formed by using one circuit board (head control board), thereby allowing the apparatus 1 to be changed in construction (specification) simply by inserting or extracting (mounting or removing) head control boards.

In the image printing apparatus 1, as described above with reference to FIGS. 1 and 4, the print image data formed by the image forming system WS0 is received via the first interface IF1. In this embodiment, the print image data is sent from the image forming system WS0 to the image printing apparatus 1 via the first interface IF1 in units of line data items each representing one line of the print image data.

Figure 7A:
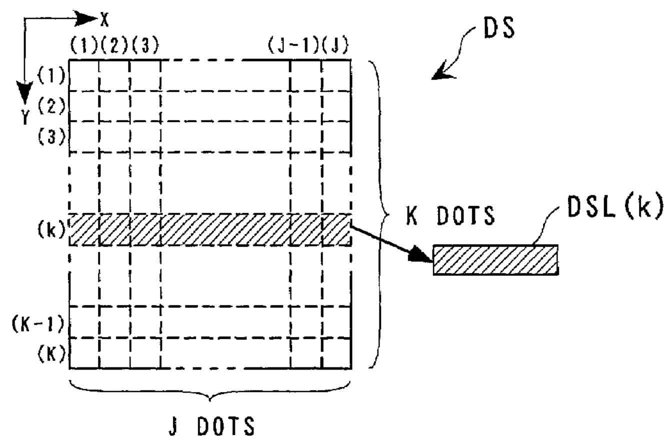
FIGS. 7A to 7C are explanatory views which are useful in explaining the relationship between a print image, print image data, a k-th short line data item, and a k-th long line data item.

For instance, as shown in FIG. 7A, in the case of a print image DS of J dots, where J is an integer equal to or larger than 2, in the direction along the X axis by K dots, where K is an integer equal to or larger than 2, in the direction along the Y axis, line data items of the print image data representing the print image DS, each representing one line of J dots arranged in the direction along the X axis, are sequentially received from the image forming system (predetermined other end of communication) WS0 via the first interface IF1, whereby K line data items corresponding to K lines in the direction along the Y axis are sequentially received.

Figure 7B:
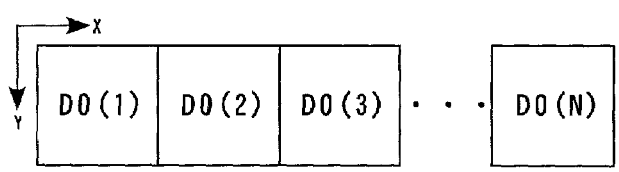

In the above case, in the image printing apparatus 1, as described hereinabove with reference to FIG. 4, K line data items are sequentially received by the image data I/O 26 via the first interface IF1. Further, when N copies of the print image (N is an integer equal to or larger than 2) are printed side by side in the direction along the X axis of a print medium, as shown in FIG. 7B, N print images D0(1) to D0(N) which are the same as the print image DS are printed.

Here, let it be assumed that as shown in FIG. 7A, a k-th line data item (k is an arbitrary integer defined as $1 \leqq k \leqq K$) of the K line data items (corresponding to the K lines) of the print image DS is set to k-th short line data DSL(k). In the image printing apparatus 1, when the k-th short line data DSL(k) is received by the image data I/O 26, the k-th short line data DSL(k) is transmitted to the head control block 60 via the internal bus 80. When the head control block 60 has received the k-th short line data DSL(k), the head control block 60 stores, based on information as to the position (i.e. k) of the received data in the print image DS and a designated color (gradation value of a designated color) (given by a command from the CPU 21 or determined by itself), the k-th short line data DSL(k) in a corresponding image buffer of one of the head control blocks (e.g. in the image buffer 6111 of the first head control block 61).

Figure 7C:
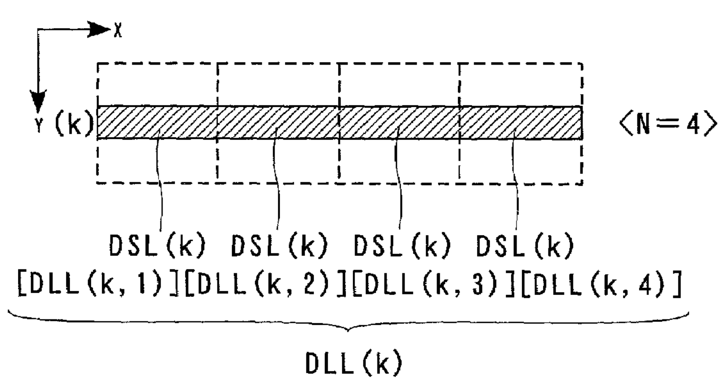

After the k-th short line data DSL(k) has been stored, in the image printing apparatus 1, N copies of the k-th short line data DSL(k) are sequentially arranged side by side in the same image buffer (e.g. the image buffer 6111), whereby k-th long line data DLL(k) is formed which represents one line of N times J dots formed by arranging N times one line of J dots in the direction along the X axis. For instance, if N=4, as shown in FIG. 7C, the k-th long line data DLL(k)

is formed which represents one line of 4 (=N) times J dots formed by arranging 4 times one line of J dots in the direction along the X axis.

Then, one line of N times J dots (N=4 in the above example) represented by the k-th long line data DLL(k) formed as above is set to a k-th line and printed on the tape (print medium) T in the direction along the X axis thereof. In this case, after the k-th line data (k-th short line data) DSL(k) has been received, N copies of the k-th line data item can be prepared to form the k-th long line data DLL(k), and one line of N times J dots can be printed whenever each line data item representing one line of J dots is received, without any need to await reception of all the K line data items, that is, reception of the whole print image data.

That is, the communication of print image data and printing of a plurality of print images formed thereafter based on the print image data can be performed by parallel processing. Therefore, in the image printing apparatus 1, it is possible to communicate print image data representing a desired print image in units of line data items each representing one line of the print image data, and at the same time print a plurality of the print images at an increased speed.

Figure 8:
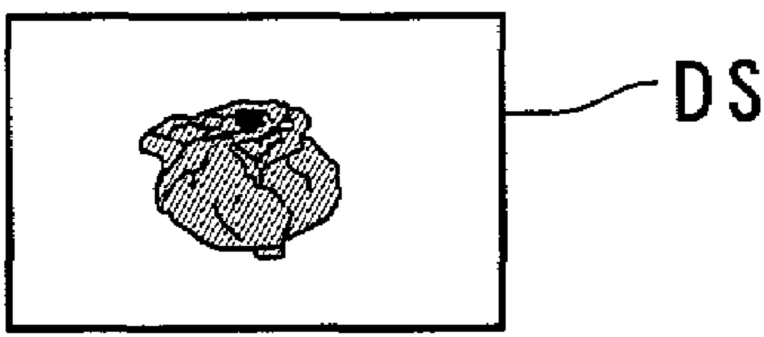
FIG. 8 is an explanatory view illustrating an example of a print image.

Now, in the image printing apparatus 1 according to the present embodiment, the print number N of copies of the print image to be printed can be specified by using one of the operating keys 3. This makes it possible to easily create the k-th long line data DLL(k) representing one line of N times J dots, based on the k-th short line data DSL(k) representing one line of J dots. Therefore, for instance, when the same six print images DS as shown in FIG. 8 are desired to be printed, by designating the print number N=6, it is possible to print six print images D1(1) to D1(6) each of which is identical to the print image DS, as shown in FIG. 9.

It should be noted that similarly to the print image data (more specifically, each line data item), print number data indicative of the print number N of copies of the print image to be printed may be received e.g. from the image forming system WS0 via the first interface IF1 or the like. In this case as well, the print number N can be definitely specified, thereby making it possible to easily create the k-th long line data DLL(k) representing one line of N times J dots, based on the k-th short line data DSL(k) representing one line of J dots.

Further, the image printing apparatus 1 may be configured such that the printable area (workable area) WPA described above with reference to FIG. 2, etc. is converted to the number of dots, and this number is defined beforehand as a predetermined printable dot number M indicative of the number of dots which can be printed in the direction along the X axis, e.g. based on the k-th long line data DLL(k), thereby allowing the print number N of copies of the print image DS to be set or determined based on the number J of dots of the print image DS in the direction along the X axis and the predetermined printable dot number M. In this case, since N times J≦M holds, the print number N of copies of the print image DS can be properly determined based on the number J of dots of the print image DS in the direction along the X axis and the predetermined printable dot number M, whereby it is possible to easily form the k-th long line data DLL(k) representing one line of N times J dots, based on the k-th short line data DSL(k) representing one line of J dots.

Further, it is also possible to set the length of the printable area WPA in the direction along the X axis directly to the predetermined printable length L. For instance, the length of the printable area WPA may be defined beforehand as the predetermined printable length L within which the print images DS can be printed in the direction along the X axis of the printable area WPA, thereby allowing the print number N of copies of the print image DS to be determined based on the number J of dots of the print image DS in the direction along the X axis, a print density, and the predetermined printable length L. In this case, since J times N times print density≦L holds, the print number N of copies of the print image DS to be printed can be determined based on the number J of dots of the print image DS in the direction along the X axis, the print density, and the predetermined printable length L, whereby it is possible to easily form the k-th long line data DLL(k) representing one line of N times J dots, based on the k-th short line data DSL(k) representing one line of J dots.

Further, when the print number N of copies of the print image DS to be printed is determined based on the number J of dots of the print image DS in the direction along the X axis, the print density, and the predetermined printable length L, the image printing apparatus 1 may be configured such that the print density can be designated by using the operating key 3 or the like. If the image printing apparatus 1 is configured such that candidates (options) for the print density in the direction along the X axis, such as 180 dot/inch (dpi), 360 dpi, 720 dpi, etc., and the state of selection of the option (present print density) can be displayed on a display panel or the indicator lamp 4, it is convenient to specify (select) a print density and grasp the present state of selection of the option. In the above cases, since the print density is designated, the print number N of copies of the print image DS satisfying the expression J×N×print density≦L can be determined with ease, thereby making it possible to easily form the k-th long line data DLL(k) based on the k-th short line data DSL(k).

Further, similarly to the print image data, print density data indicative of a print density may be received via the first interface IF1 or the like. In this case as well, the print density can be definitely specified, and hence the print number N of copies of the print image DS satisfying the expression J×N×print density≦L can be determined with ease. This makes it possible to easily form the k-th long line data DLL(k) based on the k-th short line data DSL(k).

Further, when the print number N of copies of the print image DS to be printed is determined based on the predetermined printable dot number M, or based on the print density and the predetermined printable length L, the number J of dots of the print image DS in the direction along the X axis may be detected based on received line data. In this case, if the breaks of, that is, the leading and trailing edges of line data corresponding to each line can be detected, the number J of dots of the print image DS in the direction along the X axis can be detected based on each line data item. Of course, dot number data indicative of the number J of dots may be received via the first interface IF1 or the like. In any of the above cases, the number J of dots can be definitely specified, and hence the print number N of copies of the print image DS can be determined with ease, thereby making it possible to easily form the k-th long line data DLL(k) based on the k-th short line data DSL(k).

Figure 10:
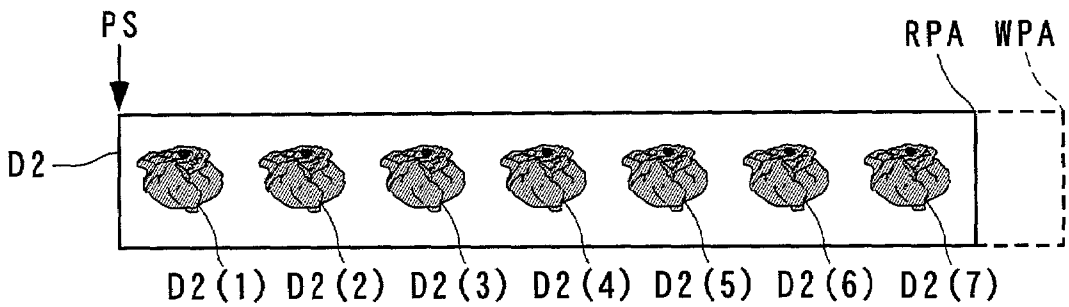
FIG. 10 is an explanatory view similar to FIG. 9, which illustrates another example.

In the above cases, for instance, when a plurality of the print images DS shown in FIG. 8 are printed, the maximum number of copies of the print image DS which can be arranged in the same printable area WPA as shown in FIG. 9 is "7", and the print number N can be set to 7, thereby making it possible to easily form the k-th long line data DLL(k) representing one line of J×7 dots, based on the k-th short line data DSL(k) representing one line of J dots. Consequently, for instance, as shown in FIG. 10, it is possible to print seven print images D1(1) to D1(7) each of which is identical to the print image DS.

Especially, in the image printing apparatus 1 according to the present embodiment, the print medium is a continuous tape T, and mounted in the apparatus such that the direction of the length thereof coincides with the direction along the X axis. More specifically, the print images can be printed on the tape T side by side in the direction of the length of the tape T, and the print number N of copies of the print image can be increased with ease. This makes it possible to easily form the k-th long line data DLL(k) representing one line of N times J dots formed by a larger number (number corresponding to a larger value of N) of copies of the original print image, based on the k-th short line data DSL(k) representing one line of J dots received. Thus, the communication of print image data and printing of a plurality of print images formed based on the print image data can be carried out with enhanced parallelism, which makes it possible to communicate print image data representing a desired print image in units of line data items each representing one line of the print image data, and at the same time print a plurality of the print images at a further increased speed.

Figure 11A:
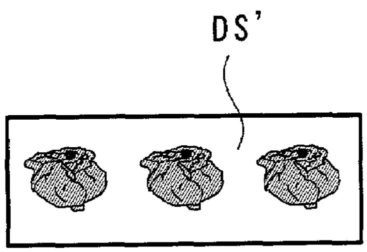
FIGS. 11A and 11B are explanatory views similar to FIG. 9, which illustrate still other examples.
Figure 11B:
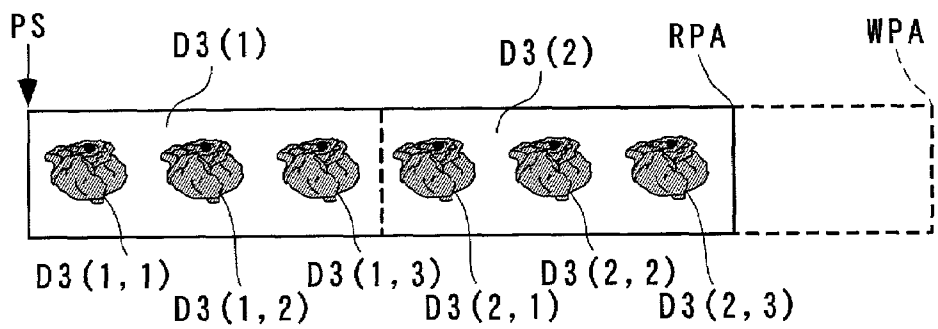

Although in the examples described above with reference to FIGS. 9 and 10, the single print image DS shown in FIG. 8 is used as an original print image, this is not limitative, but if, as shown in FIG. 11A, a print image DS' approximately three times as large as the single print image DS (three copies of the print image DS) is directly formed in the image forming system WS0, and two copies of this print image DS' are printed (D3(1), D3(2)) by the image printing apparatus 1, the result of printing of the print images DS is the same as shown in FIG. 9. In this case, the same result can be obtained if the print number N is received from the image forming system WS0, if it is designated in the image printing apparatus 1, or if it is obtained as the maximum number of print images DS from the printable area WPA.

Next, referring again to FIG. 1, the image forming system (or apparatus) WS0 in the image printing system PSYS will be described hereinafter. The image forming system WS0 forms print image data representing a desired print image DS of J dots in the direction along the X axis by K dots in the direction along the Y axis and sequentially transmits K line data items of the print image data via the first interface IF1.

In the image printing apparatus 1 on a receiving side, as described hereinabove, when the k-th line data (k-th short line data) DSL(k) of the K line data items corresponding to the K lines is received, the k-th long line data DLL(k) is formed which represents one line of N times J dots formed by arranging N lines of J dots in the direction along the X axis, and the one line of N times J dots represented by the k-th long line data DLL(k) is printed as the k-th line on a print medium (tape) T in the direction along the X axis thereof.

Therefore, in the image printing system PSYS, the communication of print image data and printing of a plurality of print images formed based on the print image data can be performed with enhanced parallelism. This enables print image data representing a desired print image DS to be communicated via the first interface IF1 in units of line data items each representing one line of the print image data, and at the same time enables a plurality of copies (N copies) of the print image DS to be printed at an increased speed.

Here, it is preferred that the first interface IF1 enables communication in conformity to any of the interface standards of RS-232C, USB (Universal Serial Bus), IEEE1394, Centronics, etc. Therefore, in the image printing apparatus 1, the image data I/O 26 described above with reference to FIG. 4 is compatible with the above interface standards (including interfaces conforming to any of these standards). Needless to say, the image forming system (device) WS0, which has a personal computer, an EWS, or the like, is compatible with these typical standards so that the system WS0 can perform communications in conformity to the standards via the first interface IF1.

It should be noted that the above standards are for wired communication and compatible not only with serial data communication (in the case of RS-232C, USB, IEEE1394, etc.) but also with parallel data communication (in the case of Centronics, etc). Therefore, in the image printing system PSYS, whichever of the above interface standards may be employed for communication, it is possible to communicate print image data representing a desired print image DS in units of line data items via the first interface IF1, and at the same time print a plurality of (N) copies of the print image DS at a high speed. It goes without saying that the first interface IF1 can be one enabling wireless communication.

Further, as shown in FIG. 1, in the image printing system PSYS, it is also possible to configure the image forming system WS0 such that it is comprised of (or replaced by) a work station WS2 having a personal computer or the like (personal computer, EWS, etc.) for use in designing print images, and a work station WS1 including a personal computer or the like for outputting print line data.

In this embodiment, the work station WS2 forms print image data representing a desired print image DS of J dots in the direction along the X axis by K dots in the direction along the Y axis, where J is an integer equal to or larger than 2 and K is an integer equal to or larger than 2, and transmits the print image data via the second interface IF2. On the other hand, the work station WS1 divides the received print image data into K line data items to sequentially send the K line data items one by one via the first interface IF1. The image printing apparatus 1 produces a k-th long line data DLL(k) based on a k-th short line data DSL(k), and prints one line of N times J dots represented by the produced k-th long line data DLL(k) as a k-th line on the tape (print medium) T in the direction along the X axis thereof.

Therefore, in this case as well, the image printing system PSYS is capable of performing the communication of print image data and printing of a plurality of print images formed based on the print image data with enhanced parallelism, thereby making it possible to communicate print image data representing a desired print image DS via the first interface IF1 in units of line data items each representing one line of the print image data, and at the same time print a plurality of (N) copies of the print image DS at an increased speed.

In this embodiment, it is preferred that the second interface IF2 enables communication via a predetermined network. For instance, when the predetermined network includes the Internet and a predetermined local area network (LAN), the second interface IF2 enables communication via the predetermined network including the Internet and the predetermined LAN. In the image printing system PSYS, it is possible not only to communicate print image data representing a desired print image DS via the second interface IF2 through the network including the Internet and the LAN, but also to communicate the print image data via the first interface IF1 in units of line data items each representing one line of the print image data, and at the same time accelerate printing of a plurality of (N) copies of the print image DS.

Further, it is preferred that the second interface IF2 enables communication in conformity to an IEEE standard LAN-based communication protocol. This makes it possible to communicate print image data representing a desired print image DS via the second interface IF2 according to the IEEE standard LAN-based communication protocol, and at the same time communicate the print image data via the first interface IF1 in units of line data items each representing one line of the print image data, thereby accelerating printing of a plurality of (N) copies of the print image DS.

Further, it is preferred that the second interface IF2 enables communication in conformity to at least one of the data link protocols of Ethernet, FDDI (Fiber Distributed Data Interface), and ATM (Asynchronous Transfer Mode). This makes it possible to communicate print image data representing a desired print image DS via the second interface IF2 according to the at least one of the data link protocols of Ethernet, FDDI, and ATM, and at the same time communicate the print image data via the first interface IF1 in units of line data items each representing one line of the print image data, thereby accelerating printing of a plurality of (N) copies of the print image DS.

It should be noted that in addition to the above data link protocols, those of Token Ring, 100VG-Any LAN, Fiber Channel, HIPPI (High Performance Parallel Interface), IEEE1394 (Fire Wire), and so forth can be used. Although the protocols of Token Ring and the like are also according to wired communication standards, it goes without saying that the second interface IF2 can employ wireless communication according to at least one of the protocols.

Referring to FIG. 1, after printing of the plurality of (N) copies of the print image DS have been terminated in the image printing system PSYS, printed portions of the tape (print medium) T, each having one of the N print images DS printed thereon are used. By using the printed portions of the tape T, it is possible to produce, for instance, labels each having one copy of the print image DS printed thereon. More specifically, in the image printing system PSYS, N copies of the print image DS can be printed at a high speed, so that it is possible to use printed portions of the tape (print medium) T, each having one of N copies of the print image DS printed thereon to produce labels each having one print image DS printed thereon.

In this embodiment, by cutting off the printed portions of the print medium, each having one print image printed thereon, it is possible to produce labels having one print image printed thereon. Further, as described hereinbefore, the tape T includes a type which has no adhesive surface on the reverse side thereof, and a type with an adhesive surface on the reverse side thereof being covered with a peel layer. The tape T of the latter type is constructed such that by peeling off the peel layer on a reverse side thereof, it can be affixed to a predetermined object article with the print image DS being printed on the surface thereof. Therefore, if labels each having one print image printed thereon are produced by using the printed portions of the print medium, each having one of N copies of the print image printed thereon, they provide labels which can be affixed to the predetermined object articles by peeling off the peel layer therefrom.

Further, as described above with reference to FIG. 11A, when not a single print image DS as shown in FIG. 8 but a plurality of (three, in the above-mentioned example) copies of the print image DS are formed directly, six copies of the print image DS can be produced by designating the print number N=2. In this case, the image printing apparatus 1 may be configured such that the print number of the six print images DS can be designated, so to speak, as an image unit number GN=6 in place of (or in combination with) the print number N=2. In this case, as in the case of the example shown in FIG. 11A, if three copies of the print image DS are formed directly, and the image unit number GN=100 is specified, for instance, the print number N becomes equal to 34 in total (since 100 divided by 3 is 33 and remainder 1), and two extra copies of the print image are printed on the last one strip of the tape T. In such a case, only the required number of print images (one print image, for instance) may be printed on the last one strip by limiting a printing area (shift amount or print number of the same single images) in the main scanning direction (direction along the X axis). Further, in the above cases, similarly to the print number N, the image unit number GN may be received from the image forming system WS0, or designated in the image printing apparatus 1.

It should be noted that various types of image printing system can be adopted in addition to the above examples so long as they can communicate print image data in units of line data items each representing one line of the print image data.

It is further understood by those skilled in the art that the foregoing is a preferred embodiment of the invention, and that various changes and modifications may be made without departing from the spirit and scope thereof.

What is claimed is:

1. A method of printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2, the method comprising the steps of:

sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis; and printing the one line of N times J dots represented by the k-th long line data item, as a k-th line on the print medium in the direction along the X axis thereof.

2. A method according to claim 1, further including the step of specifying the integer N which is a number of copies of the print image.

3. A method according to claim 1, further including the step of receiving print number data indicative of the integer N which is a number of copies of the print image.

4. A method according to claim 1, wherein a predetermined printable dot number M which is a number of dots printable in the direction along the X axis is determined based on the k-th long line data item, the method further including the step of determining the integer N which is a number of copies of the print image, based on the integer J which is a number of dots of the print image in the direction along the X axis and the predetermined printable dot number M.

5. A method according to claim 1, wherein a predetermined printable length L within which printing can be carried out in the direction along the X axis is determined based on the k-th long line data item, the method further including the step of determining the integer N which is a number of copies of the print image, based on the integer J which is a number of dots of the print image in the direction along the X axis, a print density, and the predetermined printable length L.

6. A method according to claim 5, further including the step of specifying the print density.

7. A method according to claim 5, further including the step of receiving print density data indicative of the print density.

8. A method according to claim 4, further including the step of detecting the integer J, based on received line data.

9. A method according to claim 4, further including the step of receiving dot number data indicative of the integer J.

10. A method according to claim 1, wherein the print medium is in a continuous form and mounted such that a direction of length thereof coincides with the direction along the X axis.

11. A method according to claim 1, further comprising the steps of:

forming the print image data; and sequentially transmitting the K line data items of the formed print image data via a first interface, wherein the step of sequentially receiving the K line data items corresponding to the K lines in the direction along the Y axis includes receiving the K line data items via the first interface.

12. A method according to claim 11, wherein the first interface enables communication in conformity to an interface standard of RS-232C, USB, or IEEE1394.

13. A method according to claim 11, wherein the first interface enables communication in conformity to the Centronics standard.

14. A method according to claim 11, wherein the step of sequentially transmitting the K line data items via the first interface includes the steps of:

transmitting the print image data via a second interface;

receiving the print image data via the second interface and dividing the print image data into the K line data items; and sequentially transmitting the divided K line data items one by one via the first interface.

15. A method according to claim 14, wherein the second interface enables communication via a predetermined network.

16. A method according to claim 15, wherein the predetermined network includes the Internet.

17. A method according to claim 15, wherein the predetermined network includes a predetermined local area network.

18. A method according to claim 14, wherein the second interface enables communication in conformity to an IEEE standard LAN-based communication protocol.

19. A method according to claim 14, wherein the second interface enables communication in conformity to at least one of data link protocols of Ethernet, FDDI, and ATM.

20. A method of producing a label by using a printed image formed by printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2, the method comprising the steps of:

sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis;

printing the one line of N times J dots represented by the k-th long line data item, as a k-th line on the print medium in the direction along the X axis thereof; and producing labels each having the print image printed thereon by using each of portions of the print medium on which the N copies of the print image are printed, respectively.

21. A method according to claim 20, wherein the step of producing labels includes the step of cutting off the portions of the print medium into respective separate portions.

22. A method according to claim 20, wherein the print medium is formed such that the print medium can be affixed to a predetermined object article with the print image printed on a surface thereof, by peeling off a peel layer on a reverse side thereof.

23. An image printing apparatus for printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2, the image printing apparatus comprising:

line data-receiving means for sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

long line data-forming means for setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis; and line printing means for printing the one line of N times J dots represented by the k-th long line data item, as a k-th line on the print medium in the direction along the X axis thereof.

24. An image printing apparatus according to claim 23, further including print number-specifying means for specifying the integer N which is a number of copies of the print image.

25. An image printing apparatus according to claim 23, further including print number data-receiving means for receiving print number data indicative of the integer N which is a number of copies of the print image.

26. An image printing apparatus according to claim 23, wherein a predetermined printable dot number M which is a number of dots printable in the direction along the X axis is determined based on the k-th long line data item, the method further including the step of determining the integer N which is a number of copies of the print image, based on the integer J which is a number of dots of the print image in the direction along the X axis and the predetermined printable dot number M.

27. An image printing apparatus according to claim 23, wherein a predetermined printable length L within which printing can be carried out in the direction along the X axis is determined based on the k-th long line data item, the image printing apparatus further including print number-determining means for determining the integer N which is a number of copies of the print image, based on the integer J which is a number of dots of the print image in the direction along the X axis, a print density, and the predetermined printable length L.

28. An image printing apparatus according to claim 27, further including print density-specifying means for specifying the print density.

29. An image printing apparatus according to claim 27, further including print density data-receiving means for receiving print density data indicative of the print density.

30. An image printing apparatus according to claim 26, further including dot number-detecting means for detecting the integer J, based on received line data.

31. An image printing apparatus according to claim 26, further including dot number data-receiving means for receiving dot number data indicative of the integer J.

32. An image printing apparatus according to claim 23, wherein the print medium is in a continuous form and mounted such that a direction of length thereof coincides with the direction along the X axis.

33. An image printing system comprising:

an image printing apparatus for printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2, the image printing apparatus including line data-receiving means for sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis, long line data-forming means for setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis, and line printing means for printing the one line of N times J dots represented by the k-th long line data item, as a k-th line on the print medium in the direction along the X axis thereof;

print image data-forming means for forming the print image data; and print image data-transmitting means for sequentially transmitting the K line data items of the formed print image data via a first interface, wherein the line data-receiving means receives the K line data items via the first interface.

34. An image printing system according to claim 33, wherein the first interface enables communication in conformity to an interface standard of RS-232C, USB, or IEEE1394.

35. An image printing system according to claim 33, wherein the first interface enables communication in conformity to the Centronics standard.

36. An image printing system according to claim 33, wherein said print image data-transmitting means comprises:

image data-transmitting means for transmitting the print image data via a second interface;

data dividing means for receiving the print image data via the second interface and dividing the print image data into the K line data items; and line data-transmitting means for sequentially transmitting the divided K line data items one by one via the first interface.

37. An image printing system according to claim 36, wherein the second interface enables communication via a predetermined network.

38. An image printing system according to claim 37, wherein the predetermined network includes the Internet.

39. An image printing system according to claim 37, wherein the predetermined network includes a predetermined local area network.

40. An image printing system according to claim 36, wherein the second interface enables communication in conformity to an IEEE standard LAN-based communication protocol.

41. An image printing system according to claim 36, wherein the second interface enables communication in conformity to at least one of data link protocols of Ethernet, FDDI, and ATM.

42. A label producing system for producing a label by using a printed image formed by printing N copies of a print image, where N is an integer equal to or larger than 2, on a print medium side by side in a direction along an X axis of the print medium, assuming that two axes orthogonal to each other on a two-dimensional rectangular coordinate system are set to the X axis and a Y axis, the print image being formed of J dots in the direction along the X axis by K dots in a direction along the Y axis, where J is an integer equal to or larger than 2 and K is an integer equal to or larger than 2, the label producing system comprising:

line data-receiving means for sequentially receiving line data items of print image data representing the print image, each representing one line of the J dots arranged in the direction along the X axis, according to a predetermined communication protocol from a predetermined other end of communication, thereby sequentially receiving K line data items corresponding to K lines in the direction along the Y axis;

long line data-forming means for setting a k-th line data item (k is an arbitrary integer defined as $1 \leqq k \leqq K$) of the K line data items to a k-th short line data item when the k-th line data item is received, and sequentially arranging N copies of the k-th short line data item side by side to form a k-th long line data item representing one line of N times J dots formed by arranging N lines of the J dots in the direction along the X axis;

line printing means for printing the one line of N times J dots represented by the k-th long line data item, as a k-th line on the print medium in the direction along the X axis thereof; and label producing means for producing labels each having the print image printed thereon by using each of portions of the print medium on which the N copies of the print image are printed, respectively.

43. A label producing system according to claim 42, wherein said label producing means includes cutting means for cutting off the portions of the print medium into respective separate portions.

44. A label producing system according to claim 42, wherein the print medium is formed such that the print medium can be affixed to a predetermined object article with the print image printed on a surface thereof, by peeling off a peel layer on a reverse side thereof.

* * * * *